United States Patent [19]

Noar et al.

[11] 4,285,248
[45] Aug. 25, 1981

[54] TWO-DEGREE-OF-FREEDOM GYROSCOPE

[75] Inventors: Raymond Noar, Bellflower; Louis J. Blache, Dana Point, both of Calif.

[73] Assignee: Rockwell International Corporation, El Segundo, Calif.

[21] Appl. No.: 85,576

[22] Filed: Oct. 17, 1979

[51] Int. Cl.³ .................... G01C 19/22; G01C 19/24
[52] U.S. Cl. ........................................ 74/5 F; 74/5.4; 74/5.46
[58] Field of Search ................. 74/5 F, 5.46, 5.41, 74/5.4, 5 R; 73/504; 308/2 A, 10

[56] References Cited

U.S. PATENT DOCUMENTS

| | | | |
|---|---|---|---|
| 2,704,231 | 3/1955 | Goldsmith | 74/5 R X |
| 2,746,301 | 5/1956 | Henderson | 74/5 R X |
| 2,951,374 | 9/1960 | Summers | 74/5.5 |
| 3,157,053 | 11/1964 | Hall | 74/5.41 |
| 3,370,896 | 2/1968 | Atkins | 308/10 |
| 3,434,084 | 3/1969 | Milligan | 335/284 |
| 3,490,297 | 1/1970 | Brodersen | 74/5.46 |
| 3,529,477 | 9/1970 | Quermann | 74/5 F |
| 3,540,293 | 11/1970 | Cochin | 73/504 X |
| 3,614,181 | 10/1971 | Meeks | 308/10 |
| 3,657,676 | 4/1972 | Milligan | 308/10 X |
| 3,794,391 | 2/1974 | Grosbard | 308/10 |
| 3,899,223 | 8/1975 | Baermann | 308/10 |

FOREIGN PATENT DOCUMENTS 2751040  5/1978  Fed. Rep. of Germany .

Primary Examiner—Rodney H. Bonck
Attorney, Agent, or Firm—H. Fredrick Hamann; Gilbert H. Friedman

[57] ABSTRACT

A two-degree-of-freedom gyroscope wherein a rotor is attached to and axially restrained by a taut wire fixed within the rotor drive shaft. Lateral or radial restraint for the rotor is provided by magnetic repulsion.

10 Claims, 5 Drawing Figures

TWO-DEGREE-OF-FREEDOM GYROSCOPE

The invention herein described was made in the course of or under a contract or subcontract thereunder, (or grant) with the Department of the Air Force.

BACKGROUND OF THE INVENTION

1. Field of the Invention

This invention relates to two-degree-of-freedom gyroscopes and more particularly pertains to a two-degree-of-freedom gyroscope in which the rotor is elastically suspended from a wire held taut within a drive shaft for the rotor and wherein the rotor is radially supported by magnetic repulsion.

2. Description of the Prior Art

Most of the two-degree-of-freedom displacement gyroscopes which are presently in use are of two types: the free-rotor type of gyroscope and the dry-tuned type of gyroscope. In the free-rotor type of gyroscope, the rotor is supported on a spherical electrostatic bearing or on a spherical autolubricated gas bearing. In the dry-tuned type of gyroscope, the rotor is supported on a mechanical spring of flexure system which must be precisely tuned to resonate at the spin frequency. Both of these types of displacement gyroscopes are fabricated from costly precision-machined parts. In addition, it is critical to their proper operation that a very high degree of skill and care be exercised in their assembly and in their adjustment for balance. The result is that the cost of these presently available displacement gyroscopes is a major portion of the cost of an entire inertial navigation system.

There is a need, therefore, to provide a less costly two-degree-of-freedom displacement gyroscope which requires less precision, skill and care in its fabrication, assembly and adjustment. It is an object of the invention described herein to meet these requirements.

Most of the rate gyroscopes which are presently in use are of the single-degree-of-freedom type. The rotor is mounted on a gimbal which, in the higher precision versions, is a sealed float immersed in a fluid contained within an outer housing. These gyroscopes have a relatively large number of component parts and are therefore expensive to make. An additional consideration, inertial navigation systems which employ single-degree-of-freedom rate gyroscopes require the use of more of them than would ordinarily be necessary were a satisfactory two-degree-of-freedom rate gyroscope available. These navigational systems are therefore larger, more complex and more costly to produce than they would be if they used two-degree-of-freedom rate gyroscopes.

Therefore, there is also a need for a two-degree-of-freedom rate gyroscope which is made up of comparatively fewer parts. It is another object of this invention to meet this requirement.

SUMMARY OF THE INVENTION

An object of this invention is to provide a gyroscope having a two-degree-of-freedom suspension for the gyroscope rotor.

Another object of the invention is to provide a two-degree-of-freedom gyroscope which is comparatively easy and inexpensive to fabricate from relatively few parts.

Still another object of the invention is to provide a two-degree-of-freedom gyroscope which is comparatively easy and inexpensive to assemble and adjust.

According to the present invention, these and other objects are attained in a gyroscope having a rotor directly attached to an axial suspension wire held in tension in a drive shaft for the rotor. The drive shaft and the suspension wire are directed along the rotor spin axis. The wire permits limited rotation of the rotor about any axis perpendicular to the shaft axis but the wire restrains axial displacement of the rotor. Magnets affixed to the shaft and the rotor act as a magnetic bearing supporting the rotor and restraining radial displacement thereof.

There is thus provided a universal joint for suspending the rotor which operates as a frictionless bearing at any arbitrary orientation relative to gravity because it uses no mechanical contact bearings.

Precisely dimensioned wire for use in practicing the invention is abundantly available at relatively low cost. Furthermore, the magnetic parts used do not require high precision machining to tight tolerances. The parts required for the rotor suspension are comparatively few in number. For all of these reasons, a gyroscope in accordance with the invention is relatively inexpensive to produce. In addition, a gyroscope in accordance with the invention may be manufactured in embodiments which are both highly rugged and yet small in size.

DESCRIPTION OF THE PREFERRED EMBODIMENTS

Figure 1:
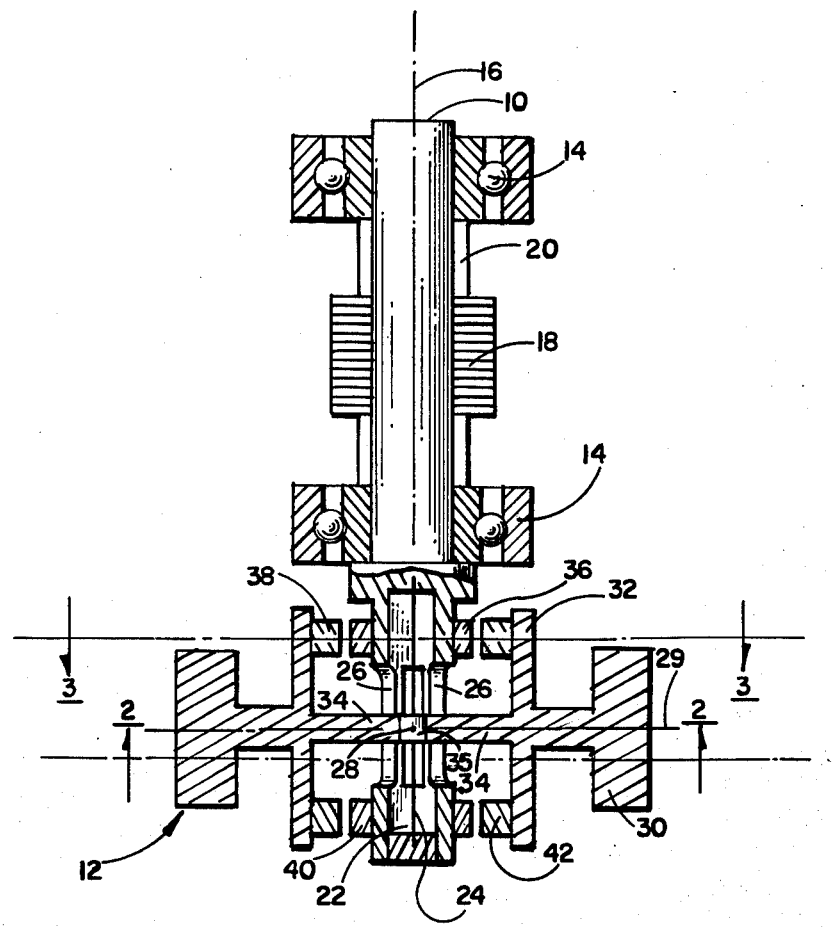
FIG. 1 is an elevation view, partly in cross-section, of a drive shaft and rotor for a two-degree-of-freedom rate gyroscope in accord with the invention.

In FIG. 1 there is shown a shaft 10 for driving and supporting a gyroscope 12. The rotor 12 is formed as a substantially cylindrical flywheel. The shaft 10 is mounted by means of bearings 14 for rotation relative to a housing (not shown). Torque for spinning the shaft 10 and rotor 12 about a central shaft axis 16 is provided by a suitable electrical spin motor. That portion of the spin motor which is fixed to the shaft 10 is represented in FIG. 1 by laminations 18 of magnetizable material axially located by spacers 20.

A cavity 22 is formed in the shaft 10 in the region thereof adjacent to the place where the rotor 12 is disposed. An axial suspension wire 24 directed along and coincident with the central shaft axis 16 is mounted on the shaft 10 and is held in tension thereby in the shaft cavity 22. Slotted openings 26 in the shaft wall permit communication between the exterior of the shaft 10 and the cavity 22 in the interior thereof.

The center of rotation 28 of the rotor 12 is at the point where the rotor center plane 29 is intersected by the rotor axis of symmetry. The rotor 12 is fabricated to have an outer rim 30 and an inner cylindrical flange 32 positioned closer to the shaft 10.

Figure 2:
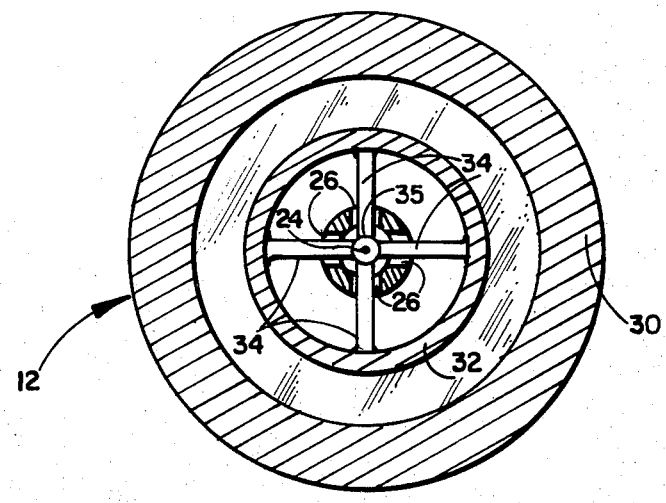
FIG. 2 is a cross-section view of the rotor and shaft shown in FIG. 1 taken along the line 2—2.

As shown in cross-section in FIG. 2, the inner portion of the rotor 12 is formed as a spider or spoked wheel having a plurality of arms 34 radiating outward from the cental rotor axis and center of rotation 28 to the inner rotor flange 32. The rotor arms 34 emerge from the interior of the shaft 10 through the slots 26.

At their innermost extensions, the rotor arms 34 are attached to the axial suspension wire 24. The attachment may be accomplished, for example, by swaging a small flange 35 to the wire 24 and then clamping the rotor arms 34 to the flange 35. This elastic suspension of the rotor 12 permits limited, frictionless rotation of the rotor 12 about any axis perpendicular to the central shaft axis 16 by elastic deformation of the wire 24. However, the axial suspension wire 24 restrains axial displacement of the rotor 12, i.e, displacement along the central shaft axis 16.

Referring back to FIG. 1, a magnetic bearing is provided for radially supporting and restraining the rotor 12 to keep it centered with respect to the shaft 10 at any orientation of the shaft 10 relative to gravity. To accomplish this, a ring 36 of magnetized material is mounted on, and preferably attached to, the shaft 10 at a selected distance to one side of the center plane 29 of the rotor 12. Ring 36 is nested within and concentric with a second ring 38 of magnetized material mounted on, and preferably attached to, the inner flange 32 of the rotor 12. Rings 36 and 38 are suitably spaced apart from each other by a narrow gap. The outer surface of the shaft ring 36 and the adjacent inner surface of the rotor ring 38 preferably each have an unvarying polarity of magnetization around their periphery. In addition, the outer surface of the shaft ring 36 has the same polarity of magnetization as the adjacent inner surface of the rotor ring 38. As a result, these two magnets act on each other in repulsion to keep the rotor 12 centered on the shaft 10.

The magnetic bearing for the gyroscope of FIG. 1 further includes a second pair of nested, concentric rings 40 and 42 similar to rings 36 and 38, respectively. Rings 40 and 42 are mounted on, and preferably attached to, the shaft 10 and rotor 12, respectively, at the same selected distance from the center plane 29 as the rings 36 and 38. Rings 40 and 42 act on each other in repulsion to keep the rotor 12 centered on the shaft 10 in the same manner as the rings 36 and 38, as discussed above. However, since the pair of rings 36 and 38 is disposed to one side of rotor center plane 29 and the pair of rings 40 and 42 is disposed on the opposite side of rotor center plane 29, their magnetic repulsion operates as well to resist rotation of the rotor 12 about any axis perpendicular to the control shaft axis 16. The resistance to this rotation increases as the angular deflection about such an axis increases due to the torque generated by the increased radial force in the region of decreased radial gap between either magnets 36 and 38 or 40 and 42, depending on the direction of the rotation. This resistance by magnetic repulsion is analogous to the resistance to rotation of the gimbal supporting the rotor offered by mechanical springs in more conventional rate gyros. The torque produced by the magnetic bearing, which comprises rings 36, 38, 40 and 42, preferably varies linearly with angular deflection in the range of interest. In other words, the magnetic bearing is preferably designed to have a spring rate which is constant. Furthermore, in the preferred embodiment, the rings 36, 38, 40 and 42 are preferably permanent magnets of a material which may be readily shaped to provide such a constant spring rate. The magnetic bearing described herein may be fabricated relatively easy and inexpensively inasmuch as tolerances for the dimensions of the rings 36, 38, 40 and 42 may be relatively liberal. Tolerances in the range from about 0.1 to 0.5 mil are expected to be adequate for these magnetic parts. On the other hand, precision-machined parts in prior-art gyros are frequently required to conform to much tighter tolerances which are in the range of tens of microinches.

Figure 3:
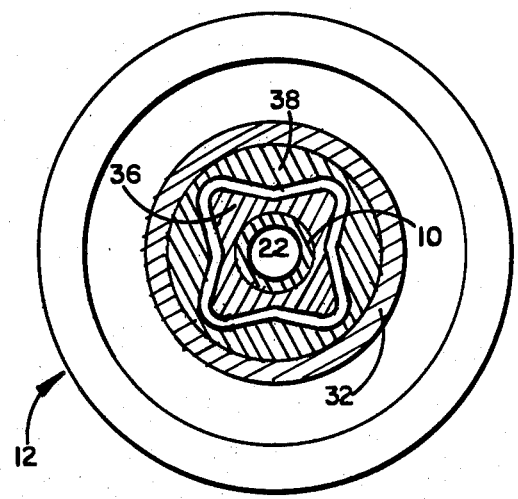
FIG. 3 is a cross-section view of the rotor and shaft shown in FIG. 1 taken along the line 3—3.

In FIG. 3, a preferred approach for shaping the end view cross-section of magnetic rings 36 and 38 is shown. The adjacent surfaces of rings 36 and 38 are shaped to follow a conforming, undulating contour. The lobes thus formed on the adjacent surfaces of each of rings 36 and 38 project into corresponding recessed formed on the other ring. The result is that axial torque is transmitted from the drive shaft 10 to the rotor 12 by magnetic repulsion. This feature provides the advantage of preventing mechanical contact between the rotor arms 34 and the shaft 10 when the rotor 12 is at operating speed. If such mechanical contact were permitted to occur, the undesirable frictional effects resulting would degrade the performance of the gyroscope. On the other hand, contact between the rotor arms 34 and the shaft 10 may occur without causing any problem while the gyroscope is being brought up to speed or being shut down.

The adjacent surfaces of magnetic rings 40 and 42 are conformed to each other in the same undulated, lobed pattern as is provided for rings 36 and 38 for the same reasons.

As an alternative approach, not shown in the drawing, a magnetic bearing for the rate gyroscope of FIG. 1 may be fabricated using cylindrical permanent magnets mounted on the shaft 10 and inner rotor flange 32 where the cylindrical permanent magnets are axially polarized. Such magnets would be used in conjunction with end pieces of high permeability material for directing the magnetic flux in the radial direction. The magnets and end pieces would replace magnetic rings 36, 38, 40 and 42. The end pieces would preferably be given the same lobed shape as is shown for the rings 36 and 38 in FIG. 3.

Figure 4:
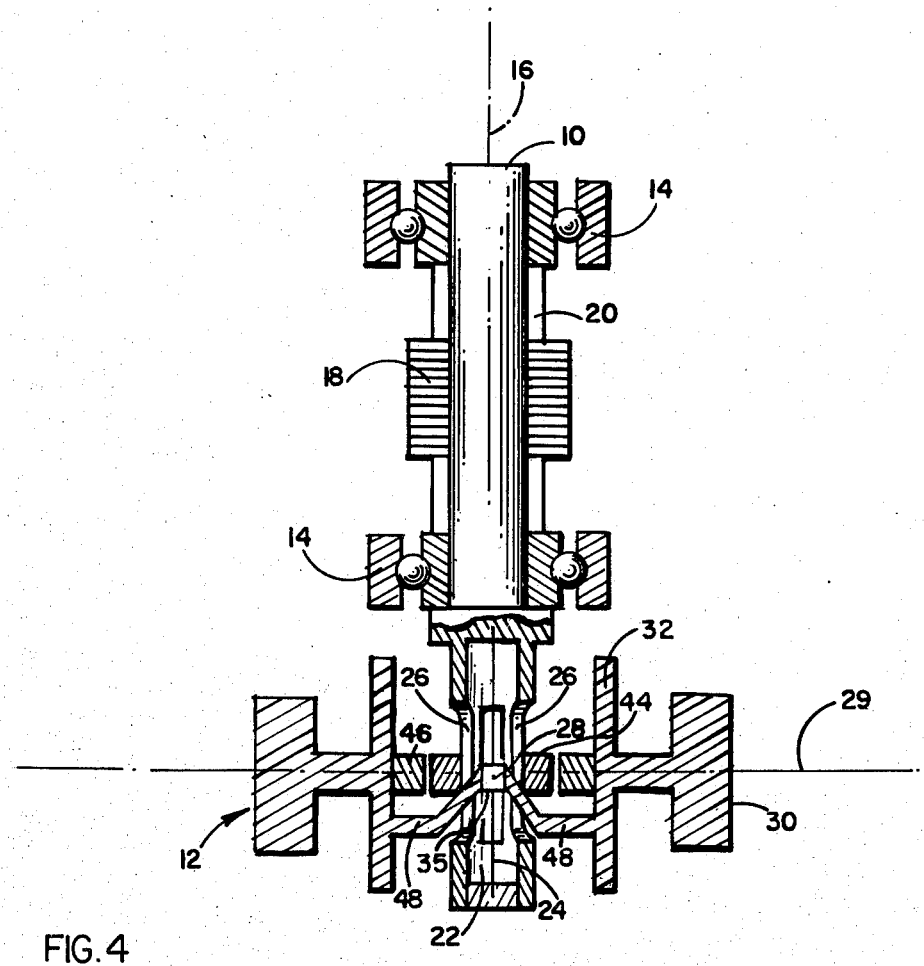
FIG. 4 is an elevation view, partly in cross-section, of a drive shaft and rotor for a two-degree-of-freedom displacement gyroscope in accord with the invention.

The two-degree-of-freedom displacement gyroscope of FIG. 4 is, in most respects, similar to the rate gyroscope of FIG. 1. As discussed above, the rotor 12 is elastically suspended from and axially restrained by a wire 24 held taut within a cavity 22 in the rotor drive shaft 10. The wire 24 is directed along the central shaft axis 16.

As in the case of the rate gyroscope of FIG. 1, radial restraint and centering of the rotor 12 for the displacement gyroscope of FIG. 4 is provided by a magnetic bearing acting in repulsion. However, only two nested, concentric magnetic rings 44 and 46 are required. The ring 44 is mounted on the shaft 10 and the ring 46 is mounted on the rotor 12 at the center plane 29 of the rotor. As in any displacement gyroscope, the object here is to eliminate or nullify any uncontrolled torque tending to cause or restrain rotation about any axis perpendicular to the central shaft axis 16. The positioning of the rings 44 and 46 at the rotor center plane 29 tends to accomplish this since the magnetic repulsion between them tends to cause such rotation while the attendant elastic deformation of the wire 24 with such rotation tends to restrain it.

The arms 48 of the spider by which the rotor 12 is attached to the wire 24 are formed to provide an attachment thereto without interfering with the positioning of the magnetic rings 44 and 46.

Except for their positioning, the magnetic rings 44 and 46 are preferably fabricated and mounted in the same manner as magnetic rings 36, 38, 40 and 42 as discussed above in connection with FIGS. 1, 2 and 3.

Figure 5:
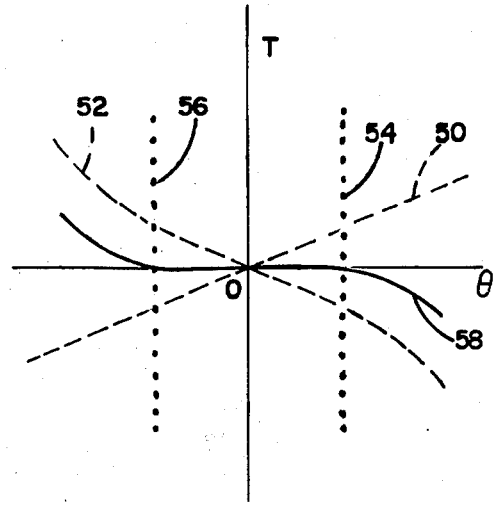
FIG. 5 is a graph depicting the variation of restoring torque with rotor deflection in a displacement gyroscope according to the invention.

Additional considerations for the fabrication of the magnetic rings 44 and 46 for the preferred embodiment displacement gyroscope are illustrated in FIG. 5. $\theta$, the angular deflection between the rotor spin axis and the central shaft axis 16, is plotted along the abscissa. T, the coupling torque acting on the rotor 12 perpendicular to its spin axis, is plotted along the ordinate. Dashed line 50 shows the linear variation of coupling restoring torque produced by the axial suspension wire 24. This component of torque tends to restrain angular deflection. The variation is representative of the positive spring rate of the elastic suspension. On the other hand, the magnetic suspension has a negative spring rate. That is to say, the magnetic forces tend to induce angular deflection of the rotor spin axis away from angular coincidence with the central shaft axis 16. This effect of the magnetic suspension is represented by dashed curve 52.

As a design goal, the characteristic 52 for the negative coupling torque produced by the magnetic suspension preferably has a substantially linear variation over a suitably wide region centered on the ordinate as, for example, the region between dotted vertical lines 54 and 56. In addition, it is a design goal that the slope of curve 52 in this region be equal in magnitude, albeit opposite in sign, to the slope of the characteristic curve 50 for the restoring torque provided by the wire 24. When these design goals are met, the torques of the elastic and magnetic suspensions nullify each other in the region between lines 54 and 56. This result is illustrated in the characteristic curve 58 representing the composite coupling torque acting on the rotor 12 perpendicular to its spin axis. Curve 58 is made as close as possible to zero for a substantial range of angular deflections. This is the desired situation for a low-drift displacement gyroscope.

Of course, controlled torques which may be applied to the rotor 12 by, for example, electromagnetic torquers are in addition to the coupling torques discussed hereinabove.

Inasmuch as the radial centering function for the rotor 12 is provided by the magnetic suspension, the wire 24 is required to provide only axial restraint. Thus, the wire 24 may be very thin. A thin wire has a very low cross-axis spring rate. Because of the low spring rate of the wire, only a similarly low negative spring rate will be required of the magnetic bearing for cancellation of the negative and positive coupling torques as discussed above. As is well known, cancellation of such quantities is more readily accomplished when the quantities are small. The combined use of a wire for axial support and a magnetic bearing for radial support of the rotor 12 thus readily provides the very low levels of cross-axis coupling required in a high performance displacement gyroscope.

While the invention has been described in its preferred embodiments, it will be understood that the words which have been used are words of description rather than of limitation and that changes within the purview of the appended claims may be made without departing from the true scope and spirit of the invention in its broader aspects.

What is claimed is:

1. A gyroscope, comprising:
   a shaft mounted for rotation about a central shaft axis;
   a wire mounted on and held taut by said shaft for rotation therewith, wherein said wire is directed along said central shaft axis;
   a substantially cylindrical rotor having a center of rotation, wherein said rotor is attached to and suspended from said wire at said center of rotation; and
   magnet means for centering said rotor and for restraining radial displacement of said rotor, wherein said magnet means is mounted for rotation about said central shaft axis with said shaft and said rotor;
   whereby there is formed a frictionless universal joint for said rotor, wherein said joint is operable at any arbitrary orientation relative to gravity, said joint permitting rotation of said rotor about any axis perpendicular to said central shaft axis while restraining axial and radial replacement of said rotor.

2. A gyroscope as recited in claim 1,
   wherein said wire is disposed in a cavity in said shaft,
   wherein said shaft has openings therein communicating with said cavity, and
   wherein said rotor is formed as a spider having arms radiating outward from said wire and through said shaft openings to the remainder of said rotor disposed exterior to said shaft.

3. A gyroscope as recited in claim 1, wherein said magnet means comprises:
   a first ring of magnetized material mounted on the outer surface of said shaft and concentric therewith; and
   a second ring of magnetized material, mounted on an inner surface of said rotor adjacent to and surrounding said first ring, wherein the adjacent surfaces of said first and second rings have the same magnetic polarity, whereby said first and second rings center and radially support said rotor by magnetic repulsion.

4. A gyroscope as recited in claim 3, wherein the adjacent surfaces of said first and second rings of magnetized material are conformed to each other in an undulating lobed pattern, whereby axial torque is transmitted magnetically between said shaft and said rotor.

5. A gyroscope as recited in claim 3,
   wherein said first and second rings of magnetized material are positioned to lie in the center plane of said rotor, and
   wherein force due to magnetic repulsion acting to cause rotation of said rotor about an axis perpendicular to said central shaft is counterbalanced by force due to restraint by said wire acting to prevent such rotation,
   thereby enabling said gyroscope to function as a displacement gyroscope having two degrees of freedom.

6. A gyroscope as recited in claim 3,
   wherein said first and second rings of magnetized material are positioned on said shaft and said rotor, respectively, a selected distance to one side of the center plane of said rotor, and
   wherein said magnet means further comprises third and fourth rings of magnetized material substantially the same as said first and second rings and similarly mounted on said shaft and rotor, respectively, said selected distance to the other side of the center plane of said rotor, whereby rotation of said rotor about any axis perpendicular to said central shaft axis is restrained by a torque proportional to the angular displacement of such rotation thereby enabling said gyroscope to function as a rate gyroscope having two degrees of freedom.

7. A gyroscope, comprising:

a shaft mounted for rotation about a cental shaft axis;

a wire mounted on and held taut by said shaft for rotation therewith, wherein said wire is directed along said central shaft axis;

a substantially cylindrical rotor having a center of rotation, wherein said rotor is attached to and suspended from said wire at said center of rotation; and magnet means for centering said rotor and for restraining radial displacement of said rotor;

whereby there is formed a frictionless universal joint for said rotor, wherein said joint is operable at any arbitrary orientation relative to gravity, said joint permitting rotation of said rotor about any axis perpendicular to said central shaft axis while restraining axial and radial displacement of said rotor;

wherein said wire is disposed in a cavity in said shaft, wherein said shaft has openings therein communicating with said cavity, and wherein said rotor is formed as a spider having arms radiating outward from said wire and through said shaft openings to the remainder of said rotor disposed exterior to said shaft.

8. A gyroscope, comprising:

a shaft mounted for rotation about a central shaft axis;

a wire mounted on and held taut by said shaft for rotation therewith, wherein said wire is directed along said central shaft axis;

a substantially cylindrical rotor having a center of rotation, wherein said rotor is attached to and suspended from said wire at said center of rotation; and magnet means for centering said rotor and for restraining radial displacement of said rotor;

whereby there is formed a frictionless universal joint for said rotor, wherein said joint is operable at any arbitrary orientation relative to gravity, said joint permitting rotation of said rotor about any axis perpendicular to said central shaft axis while restraining axial and radial displacement of said rotor;

wherein said magnet means comprises:

a first ring of magnetized material mounted on the outer surface of said shaft and concentric therewith; and a second ring of magnetized material, mounted on an inner surface of said rotor adjacent to and surrounding said first ring, wherein the adjacent surfaces of said first ring and second rings have the same magnetic polarity, whereby said first and second rings center and radially support said rotor by magnetic repulsion;

wherein the adjacent surfaces of said first and second rings of magnetized material are conformed to each other in an undulating lobed pattern, whereby axial torque is transmitted magnetically between said shaft and said rotor.

9. A gyroscope, comprising:

a shaft mounted for rotation about a central shaft axis;

a wire mounted on and held taut by said shaft for rotation therewith, wherein said wire is directed along said central shaft axis;

a substantially cylindrical rotor having a center of rotation, wherein said rotor is attached to and suspended from said wire at said center of rotation; and magnet means for centering said rotor and for restraining radial displacement of said rotor;

whereby there is formed a frictionless universal joint for said rotor, wherein said joint is operable at any arbitrary orientation relative to gravity, said joint permitting rotation of said rotor about any axis perpendicular to said central shaft axis while restraining axial and radial displacement of said rotor;

wherein said magnet means comprises:

a first ring of magnetized material mounted on the outer surface of said shaft and concentric therewith; and a second ring of magnetized material, mounted on an inner surface of said rotor adjacent to and surrounding said first ring, wherein the adjacent surfaces of said first and second rings have the same magnetic polarity, whereby said first and second rings center and radially support said rotor by magnetic repulsion;

wherein said first and second rings of magnetized material are positioned to lie in the center plane of said rotor, and wherein force due to magnetic repulsion acting to cause rotation of said rotor about an axis perpendicular to said central shaft is counterbalanced by force due to restraint by said wire acting to prevent such rotation, thereby enabling such gyroscope to function as a displacement gyroscope having two degrees of freedom.

10. A gyroscope, comprising:

a shaft mounted for rotation about a cental shaft axis;

a wire mounted on and held taut by said shaft for rotation therewith, wherein said wire is directed along said central shaft axis;

a substantially cylindrical rotor having a center of rotation, wherein said rotor is attached to and suspended from said wire at said center of rotation; and magnet means for centering said rotor and for restraining radial displacement of said rotor;

whereby there is formed a frictionless universal joint for said rotor, wherein said joint is operable at any arbitrary orientation relative to gravity, said joint permitting rotation of said rotor about any axis perpendicular to said central shaft axis while restraining axial and radial displacement of said rotor;

wherein said magnet means comprises:

a first ring of magnetized material mounted on the outer surface of said shaft and concentric therewith; and a second ring of magnetized material, mounted on an inner surface of said rotor adjacent to and surrounding said first ring, wherein the adjacent surfaces of said first and second rings have the same magnetic polarity, whereby said first and second rings center and radially support said rotor by magnetic repulsion;

wherein said first and second rings of magnetized material are positioned on said shaft and said rotor, respectively, a selected distance to one side of the center plane of said rotor, and wherein said magnet means further comprises third and fourth rings of magnetized material substantially the same as said first and second rings and similarly mounted on said shaft and rotor, respectively, said selected distance to the other side of the center plane of said rotor, whereby rotation of said rotor about any axis perpendicular to said central shaft axis is restrained by a torque proportional to the angular displacement of such rotation thereby enabling said gyroscope to function as a rate gyroscope having two degrees of freedom.

* * * * *

UNITED STATES PATENT AND TRADEMARK OFFICE
CERTIFICATE OF CORRECTION

PATENT NO. : 4,285,248
DATED : August 25, 1981
INVENTOR(S) : Raymond Noar et al

It is certified that error appears in the above-identified patent and that said Letters Patent are hereby corrected as shown below:

Column 2, line 36, after "2-2.", start a new paragraph with "FIG.".
Column 2, line 49, after "gyroscope" insert the word -- rotor --.
Column 4, line 3, after "rate", start a new paragraph with "The".
Column 4, line 4, change the word "easy" to read -- easily --.
Column 4, line 19, change the word "recessed" to read -- recesses --.
Column 6, line 22, change "replacement" to read -- displacement --.
Column 8, line 37, change "such" to read -- said --.
Column 8, line 41, change "cental" to read -- central --.

Signed and Sealed this

Third Day of November 1981

[SEAL]

Attest:

GERALD J. MOSSINGHOFF

*Attesting Officer*     *Commissioner of Patents and Trademarks*